United States Patent
Thakore et al.

(10) Patent No.: US 11,689,474 B2
(45) Date of Patent: *Jun. 27, 2023

(54) ADJUSTABLE RESOURCE MANAGEMENT SYSTEM

(71) Applicant: Beijing Tenafe Electronic Technology Co., Ltd., Beijing (CN)

(72) Inventors: Priyanka Nilay Thakore, Mountain View, CA (US); Lyle E. Adams, San Jose, CA (US); Chen Xiu, Beijing (CN)

(73) Assignee: Beijing Tenafe Electronic Technology Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/588,721

(22) Filed: Jan. 31, 2022

(65) Prior Publication Data

US 2023/0035289 A1     Feb. 2, 2023

Related U.S. Application Data

(63) Continuation of application No. 17/386,103, filed on Jul. 27, 2021, now Pat. No. 11,277,355.

(51) Int. Cl.
  *G06F 15/16*  (2006.01)
  *H04L 47/70*  (2022.01)
(52) U.S. Cl.
  CPC .................... *H04L 47/82* (2013.01)
(58) Field of Classification Search
  CPC .......................................... H04L 47/82
  USPC ...................................... 709/238
  See application file for complete search history.

(56) References Cited

U.S. PATENT DOCUMENTS

| | | | |
|---|---|---|---|
| 7,530,068 B2 | 5/2009 | Clark | |
| 8,261,277 B2 | 9/2012 | Prabhakar | |
| 8,495,646 B2 * | 7/2013 | Uchida | G06F 11/3409 718/104 |
| 8,903,406 B2 | 12/2014 | Muniere | |
| 10,117,103 B2 | 10/2018 | Zhao | |
| 10,360,514 B2 | 7/2019 | Cui | |
| 11,277,355 B1 * | 3/2022 | Thakore | H04L 47/822 |

(Continued)

FOREIGN PATENT DOCUMENTS

| | | |
|---|---|---|
| CN | 105122857 | 12/2015 |
| CN | 110546612 | 12/2019 |
| TW | 201303617 | 1/2013 |

*Primary Examiner* — Moustafa M Meky
(74) *Attorney, Agent, or Firm* — Van Pelt, Yi & James LLP

(57) ABSTRACT

Central processing units (CPUs) are configured to support host access instruction(s) that are associated with accessing solid state storage. A resource management module, implemented independently of the CPUs, receives a resource allocation request that includes a usage type identifier and requested amount of a resource, where the usage type identifier is associated with a group identifier. Adjustable resource configuration information is accessed to obtain: (1) a maximum associated with the usage type identifier, (2) a minimum associated with the usage type identifier, and (3) a group limit associated with the group identifier. Resource state information is accessed and it is determine whether to grant the request based at least in part on the maximum, minimum, group limit, and resource state information. The resource allocation request is then granted or denied based on the determination.

20 Claims, 9 Drawing Sheets

(56) References Cited

U.S. PATENT DOCUMENTS

| | | |
|---|---|---|
| 2005/0138621 A1 | 6/2005 | Clark |
| 2006/0190482 A1 | 8/2006 | Kishan |
| 2009/0183168 A1* | 7/2009 | Uchida ................. G06F 9/5027 |
| | | 718/104 |
| 2017/0006474 A1 | 1/2017 | Zhao |
| 2017/0257289 A1 | 9/2017 | Cui |
| 2017/0272336 A1 | 9/2017 | Johnstone |
| 2018/0316626 A1 | 11/2018 | Tian |
| 2019/0116589 A1 | 4/2019 | Shimomura |
| 2019/0294996 A1 | 9/2019 | Cui |
| 2021/0045093 A1* | 2/2021 | Rao ....................... H04W 72/04 |

* cited by examiner

Adjustable Resource Configuration Information - Hardware

| Use Type ID | Type Name | Group ID | Group Name | Limit | Min | Max |
|---|---|---|---|---|---|---|
| Type_0 | FTL Table | Group_0 | Buffer | 1024 | 256 | 256 |
| Type_1 | Host Write | | | | 64 | 512 |
| Type_2 | Host Read | | | | 256 | 512 |
| Type_3 | RAID | Group_1 | RAID Bins | 64 | 64 | 64 |

Adjustable Resource Configuration Information - Firmware

| Use Type ID | Type Name | Group ID | Group Name | Limit | Min | Max |
|---|---|---|---|---|---|---|
| Type_0 | Host IO | Group_2 | Front-End Command | 1024 | 192 | 512 |
| Type_1 | ME Host Split | | | | 4 | 512 |
| Type_2 | BCMD | Group_3 | Back-End Cmd. | 256 | 256 | 256 |

FIG. 4A

| Type Name | Group ID | Group Name | Limit | Min | Max |
|---|---|---|---|---|---|
| Host IO | Group_2 | Firmware Commands | 1280 (1024 + 256) | 192 | 512 |
| ME Host Split 1 | | | | 4 | 512 |
| ME Host Split 2 | | | | 256 | 256 |

Adjustable Resource Configuration Information - Firmware

FIG. 4B

Resource State Information

| Resource ID | Allocated? | Type ID |
|---|---|---|
| 0x000 | TRUE | Type_1 |
| 0x001 | FALSE | N/A |
| ⋮ | ⋮ | ⋮ |
| 0x7FF | FALSE | N/A |

Resource Allocation Request

| Header | Type ID | Group ID |
|---|---|---|
| Request_Type | Type_1 | Group_0 |

Resource Allocation Response

| Header | Resource ID | Granted? |
|---|---|---|
| Response_Type | 0x000 | TRUE |

Deallocation Message

| Header | Resource ID | Group ID |
|---|---|---|
| Deallocation_Type | 0x000 | Group_0 |

FIG. 5

ADJUSTABLE RESOURCE MANAGEMENT SYSTEM

CROSS REFERENCE TO OTHER APPLICATIONS

This application is a continuation of U.S. patent application Ser. No. 17/386,103 entitled ADJUSTABLE RESOURCE MANAGEMENT SYSTEM filed Jul. 27, 2021 which is incorporated herein by reference for all purposes.

BACKGROUND OF THE INVENTION

System resources (such as buffers or other memory) which are shared amongst multiple processes and/or devices are often allocated and deallocated depending upon the needs of the requestor. For example, the commands malloc( ) and free( ) are used to request the allocation of memory and free allocated memory, respectively. New resource allocation systems and/or techniques which improve the performance of the system would be desirable.

BRIEF DESCRIPTION OF THE DRAWINGS

Various embodiments of the invention are disclosed in the following detailed description and the accompanying drawings.

FIG. 4A shows two tables illustrating embodiments of adjustable resource configuration information for hardware resources and firmware resources, respectively.

FIG. 4B is a diagram illustrating an embodiment of a change to the number of usage types and groups.

FIG. 5 is a diagram illustrating an embodiment of resource state information and associated allocation communications.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of an adjustable resource management system are described herein. In some embodiments, one or more resource requestors (e.g., identified by type identifiers) are grouped and those grouped resource requestors share a pool of resources (e.g., hardware resources or firmware resources). In one example, the resource may be a buffer in hardware and resource requestors which want to use the buffer are grouped together. The groups and associated limits (e.g., maximums or minimums) may be stored in resource configuration information which is adjustable. For example, a limit may be adjusted on-the-fly (e.g., if some resource requestors are more active than others), a new group may be created, a resource requestor may be moved to a different group, etc. The following figure describes one embodiment of an adjustable resource management process which is performed by a resource management module.

Figure 1:
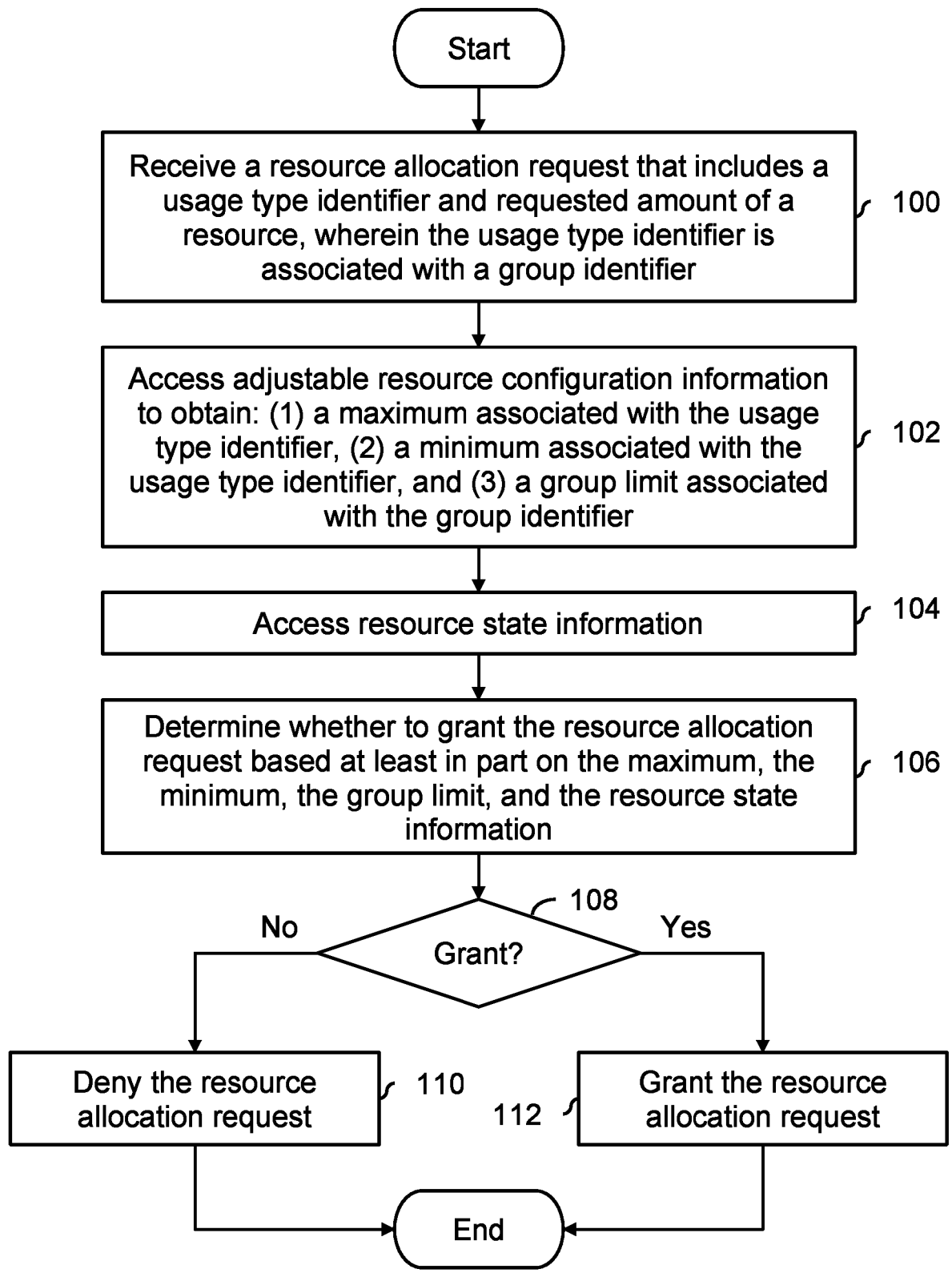
FIG. 1 is a flowchart illustrating an embodiment of a process to allocate resources in an adjustable manner.

FIG. 1 is a flowchart illustrating an embodiment of a process to allocate resources in an adjustable manner. In some embodiments, the process is performed by a resource management module or a controller therein. In some embodiments, the resource management module is separate from and/or external to a plurality of central processing units (CPU). In contrast, some other systems may have one or more of the CPUs being responsible for resource management and/or allocation.

At 100, a resource allocation request that includes a usage type identifier and requested amount of a resource is received, wherein the usage type identifier is associated with a group identifier. For example, the requested amount may specify the number or amount of the desired resource that is being requested. The type identifier (e.g., uniquely) identifies which process or device (sometimes referred to herein as a (resource) requestor) sent the resource request. In some embodiments, the resource being requested is a hardware resource (e.g., a resource in hardware or associated with hardware) or a firmware resource (e.g., a resource in firmware or associated with firmware).

In this example, resource requestors are grouped into groups of one or more resource requestors, where resource requestors in the same group share a specified amount of a given resource. As will be described in more detail below, in some embodiments, some groups may have only a single resource requestor (and therefore do not need to share the pool of resources associated with that group) whereas other groups have multiple resource requestors. Each group is (e.g., uniquely) identified by a group identifier.

At 102, adjustable resource configuration information is accessed to obtain: (1) a maximum associated with the usage type identifier, (2) a minimum associated with the usage type identifier, and (3) a group limit associated with the group identifier. For example, the adjustable resource configuration information may store which resource requestors (e.g., identified by usage type identifier) are part of which group, maximums and minimums for each resource requestor, and the group limits for each group.

At 104, resource state information is accessed. For example, the resource state information may record what resources are currently allocated or not. In some embodiments, the resource state information also records the usage type identifier for each allocated resource.

At 106, it is determined whether to grant the resource allocation request based at least in part on the (e.g., usage type) maximum, the (e.g., usage type) minimum, the group limit, and the resource state information. In one example, in order for the resource allocation request to be granted, neither the (e.g., usage type) maximum nor the group limit can be exceeded by the requested amount, nor can the minimum be violated for other usage types in the same group. Naturally, there needs to be a sufficient amount of free resources available to be allocated. In some embodiments, other factors or considerations are also taken into account (i.e., not exceeding the maximum or the group limit are necessary but not sufficient conditions for the request to be granted).

If it is decided to grant (108), the resource allocation request is granted at 112. For example, the resource state information is updated to reflect the allocation of the requested resources and applicable and/or related information is stored (e.g., in some embodiments, the type identifier). A grant communication is sent from the adjustable resource management module to the resource requestor. If not, the resource allocation request is denied at 110. For example, a denial communication is sent from the adjustable resource management module to the resource requestor.

It may be helpful to give an example of an adjustable resource management system that performs the process of FIG. 1 in a specific application. The following figure describes one such example system in a storage application.

Figure 2:
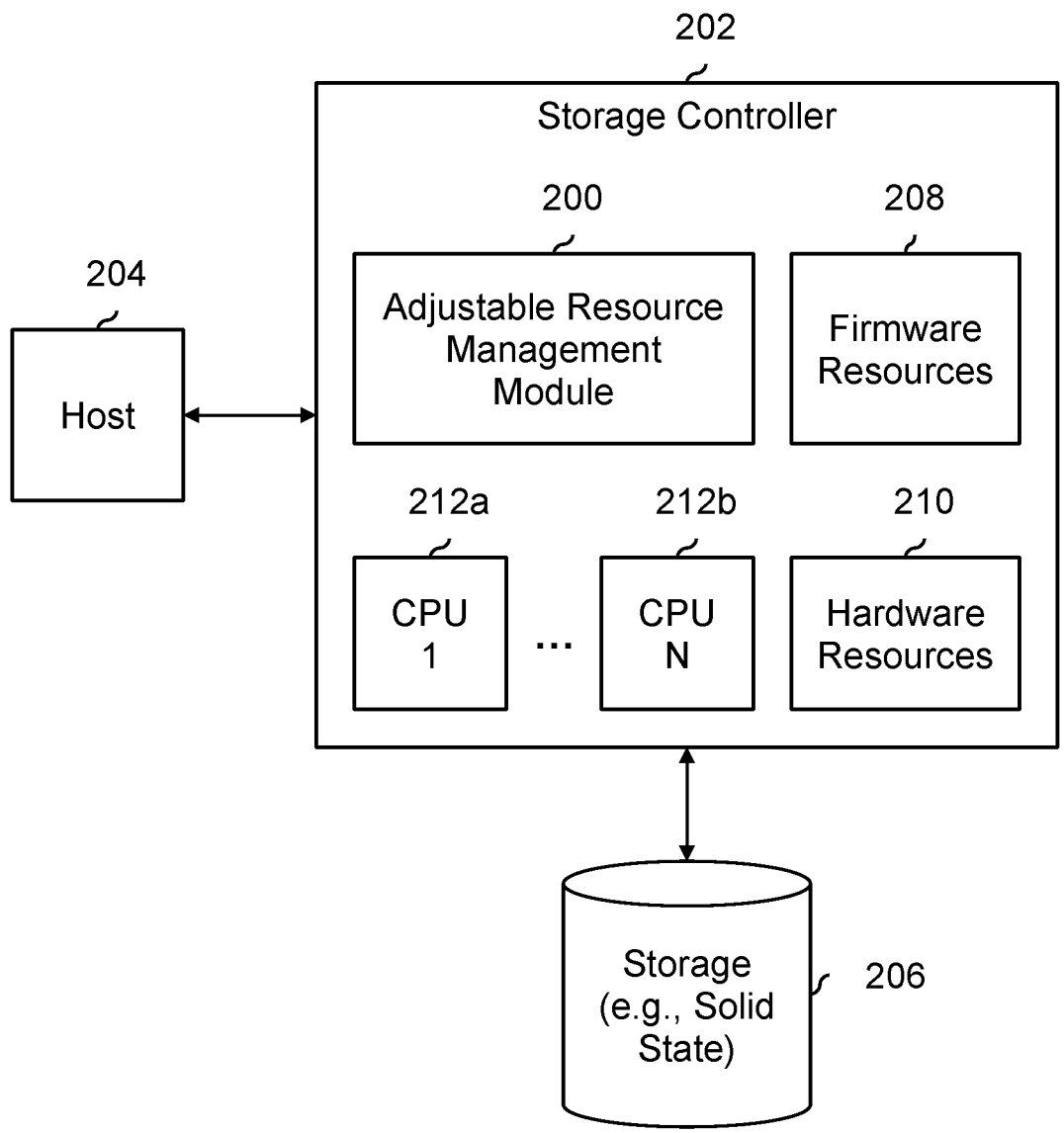
FIG. 2 is a block diagram illustrating an embodiment of a storage system with an adjustable resource management module.

FIG. 2 is a block diagram illustrating an embodiment of a storage system with an adjustable resource management module. In some embodiments, the adjustable resource management module (200) shown here performs the process of FIG. 1. In some embodiments, the adjustable resource management module (200) is implemented at least in part on hardware (e.g., an application-specific integrated circuit (ASIC), a field-programmable gate array (FPGA), or a general-purpose integrated circuit (e.g., a microcontroller). In some other embodiments, the adjustable resource management module (200) is implemented at least in part using computer instructions (e.g., a computer program product embodied in a non-transitory computer readable medium, firmware (computer) instructions, etc.).

In this example, the adjustable resource management module (200) is part of a storage controller (202). The storage controller (202) receives instructions (e.g., read instructions, write instructions, erase instructions, etc.) from a host (204) that are directed to and/or associated with storage (206). In some embodiments, the storage includes solid state storage (e.g., Flash).

The storage controller (202) in this example has firmware resources (208) and hardware resources (210) that are managed by the adjustable resource management module (200). For example, the adjustable resource management module (200) may receive a resource allocation request for firmware resources (208) or hardware resources (210) from any of the CPUs (212a-212b). The adjustable resource management module (200) then performs the process of FIG. 1 to determine whether to grant or deny the request.

Storage systems tend to grow in storage capacity and complexity. For example, one way to increase the storage capacity of solid state storage systems is to increase the number of bits stored per cell. Single-level cell (SLC), multi-level cell (MLC), tri-level cell (TLC), and quad-level cell (QLC) configurations store one (1) bit through four (4) bits per memory cell, respectively. As the number of bits per cell increases, more complex error correction decoders (e.g., low-density parity-check (LDPC) decoders) and in general more processing resources are needed. This, in turn, may require storage controllers to have multiple CPUs.

Some previous storage controllers with multiple CPUs had resource allocation management (e.g., of firmware resources (208) and hardware resources (210)) performed amongst the CPUs. To support this, these other storage controllers had to perform handshaking between the CPUs to manage management of the resources. In contrast, the exemplary storage controller (202) shown here offloads resource management from the CPUs (212a-212b) to a centralized location (i.e., the adjustable resource management module (200)), which is smaller and less complex than the handshaking logic required when resource management is handled by multiple entities (e.g., multiple CPUs). Furthermore, some of the lower-level resource management tasks (e.g., freeing up the resource, pushing or pulling the resource as part of the allocation process, etc.) are offloaded to the adjustable resource management module (200), freeing up processing resources at the CPU and permitting less powerful and/or smaller CPUs to be used in the system, if desired.

Returning briefly to FIG. 1, it is noted that an adjustable resource management module uses adjustable resource configuration information (see, e.g., step 102 in FIG. 1) and resource state information (see, e.g., step 104 in FIG. 1) in deciding whether to deny or grant a resource allocation request. The following figures describe more detailed examples of these pieces of information and illustrate further benefits associated with an adjustable resource management module (200).

Figure 3:
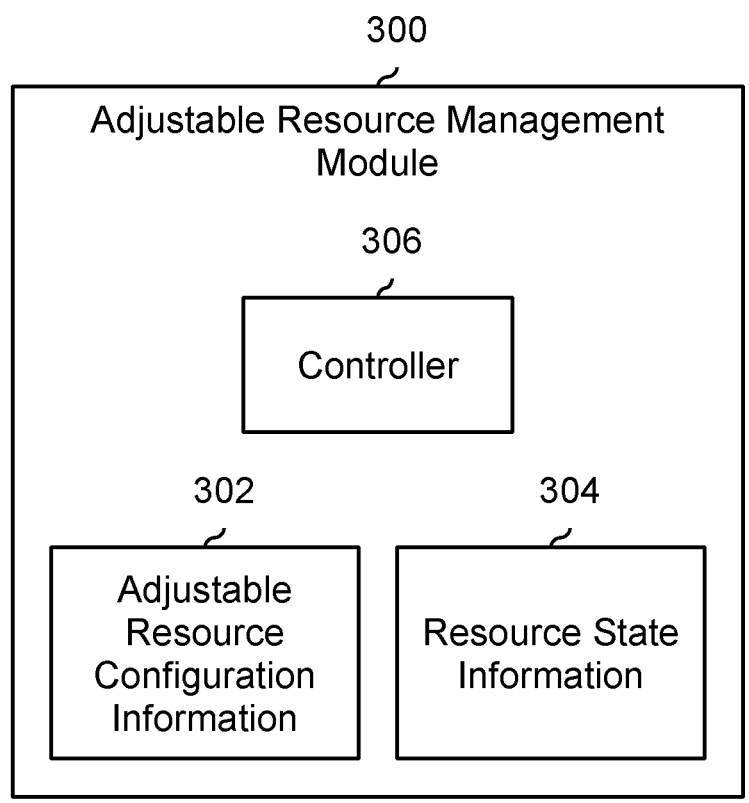
FIG. 3 is a block diagram illustrating an embodiment of an adjustable resource management module.

FIG. 3 is a block diagram illustrating an embodiment of an adjustable resource management module. In some embodiments, the adjustable resource management module (200) in FIG. 2 is implemented as shown. In this example, the adjustable resource management module (300) includes adjustable resource configuration information (302), resource state information (304), and a controller (306). In some embodiments, the adjustable resource configuration information (302) and/or resource state information (304) is/are stored on some memory in the adjustable resource management module (300).

The adjustable resource configuration information (302) describes any limitations, such as minimums (e.g., a guaranteed number of resources that are available to a given resource requestor, regardless of what other resource requestors in that group have requested or been granted) or maximums (e.g., for a resource requestor individually or a group collectively) for the relevant resource. In some embodiments, one or more resource requestors are grouped together and any grouped resource requestors must share resources with other resource requestors in the group; this grouping information may be stored in the adjustable resource configuration information (302). As implied by the name, any information stored therein is adjustable (e.g., the resource requestors in a given group can be changed, number of groups sharing the total resources can be changed, a minimum can be changed, a maximum can be changed, etc.). In some embodiments, a change in the number of groups can be done (i.e., is permitted) when the system is in idle state (i.e., no resources are outstanding). In some embodiments, the minimum and maximum values for each type can be changed dynamically (e.g., even if resources have been assigned but only under some conditions). Some examples of adjustable resource configuration information and changes to it are described in more detail below.

The resource state information (304) records or otherwise reflects the current (e.g., allocation) state of the resources. In some embodiments, in addition to recording what resources are currently allocated, some additional information associated with the resource requestors is stored in the resource state information (e.g., a type identifier).

In order for a resource allocation request to be granted by the adjustable resource management module (300) (or, more specifically, the controller (306)), a necessary (but not necessarily sufficient) condition is that the resource state information (304) must indicate that there is a sufficient number or amount of available (i.e., unallocated) resources. Furthermore, another necessary (but not necessarily sufficient) condition is that the request would not exceed any individual or group limitations (e.g., maximums) specified in the adjustable resource configuration information (302).

The following figure describes a more detailed example of the adjustable resource configuration information (302).

FIG. 4A shows two tables illustrating embodiments of adjustable resource configuration information for hardware resources and firmware resources, respectively. In some embodiments, an adjustable resource management module manages hardware and/or firmware resources and these tables show two examples of what the adjustable resource configuration information may include.

The top table (400) shows an example of adjustable resource configuration information for hardware resources. In this example, the hardware resources being managed include a buffer (in this example with 1,024 buffer slots which can be allocated in units of one or more upon request and grant) and RAID bins (in this example with 64 RAID bins which can be allocated in units of one or more upon request and grant).

In this example, requests for buffer slots come from three resource requestors: the flash translation layer (FTL) (see the first row (420)), host writes (see the second row (422)), and host reads (see the third row 424). For convenience, the type names (i.e., the names of the resource requestors) are shown in the second from left column (404) and their corresponding usage type identifiers (of Type_0, Type_1, and Type_2, respectively) are shown in the leftmost column (402). The terms usage type identifiers, type identifiers, and resource requestors are used interchangeably herein.

As shown by the group identifier column (406), all three resource requestors (see rows 420, 422, and 424) are grouped together and have the same group ID of Group 0, which is associated with the buffer. For convenience, the group name is included in the center column (408). The third from right column (410) shows that there is a limit of 1,024 buffer slots that are available for the buffer group.

For context, the FTL table stores the physical-to-logical address mapping that is stored in the shared buffer and therefore needs to be allocated buffer slots. For example, in FIG. 2, the host (204) uses a logical address but the storage (206) uses a physical address and a mapping between the two is maintained. This mapping information is very important and so the (e.g., guaranteed) minimum for the FTL table in this example is the same value as the maximum.

Host writes (see row 422) is associated with write data from a host (e.g., 204 in FIG. 2). When a host (e.g., 204 in FIG. 2) sends write data to the storage controller (e.g., 202 in FIG. 2) to be stored in the storage (e.g., 206 in FIG. 2), the write data is stored temporarily in the shared buffer and buffer slots may be requested for that purpose. To ensure that none of the traffic read or writes are starved, a small buffer pool is set as minimum for host writes, in this example a minimum of 64.

Host reads (see row 424) are associated with read requests from the host (e.g., 204 in FIG. 2). In some embodiments, the system pre-allocates the buffer for read requests. Once the data is read back from (e.g., Flash) storage (e.g., 206 in FIG. 2), the read-back data can be store in the buffer to be processed by the error correction code (ECC) engine to correct any bit errors in the read-back data. The buffer is emptied when the corrected data is sent to the host, thereby completing the read request.

The fourth row (426) in the top table (400) is associated with RAID bins (e.g., which hold program failure recovery data) and there is only one resource requestor in that group. For example, a minimum resource requirement may prevent system deadlocks by ensuring that no process which requires access to the resource stalls for lack of resources.

As shown in the top table (400) and bottom table (450), in some embodiments, the resource (e.g., associated with the resource allocation request received at step 100 in FIG. 1) includes one or more of the following: a hardware resource, a buffer in hardware, a RAID bin in hardware, a firmware resource, a front-end command in firmware, or a back-end command in firmware.

The minimum column (412) shows the minimum (i.e., guaranteed) number of resources that a given resource requestor of the system is guaranteed (e.g., regardless of what other resource requestors in that group have been allocated).

The maximum column (414) shows the maximum number that a given resource requestor will be granted. In some applications, a maximum resource limit may be desirable because it prevents performance dips caused by resource hogging.

In some embodiments, while the minimum (412) is a guaranteed value that the system will always honor, the maximum (414) is not a guaranteed amount but is dependent upon the other resource requestors in the group. For example, if the other resource requestors in the group are relatively inactive, then a maximum amount may be allocated or otherwise granted to a resource type that is requesting resources. However, if the other resource requestors in the group are active, then the system may not be able to allocate the maximum amount to a resource type that is requesting resources.

Neither the group limit (e.g., in the limit column (410)) nor the individual maximum (e.g., in the maximum column (414)) can be exceeded when a resource allocation request is being considered. Likewise, a request is not granted if the requested amount would prevent a (e.g., guaranteed) minimum for another usage type identifier from being subsequently granted.

The bottom table (450) shows an example of adjustable resource configuration information for firmware resources. As with the top table (400), the bottom table (450) has a usage type identifier column (452), a type name column (454), a group identifier column (456), a group name column (458), a (group) limit column (460), a (usage type) minimum column (462), and (usage type) maximum column (464).

It is noted that in this example, the group identifiers (406 and 456) are globally unique across both tables (400 and 450) but the usage type identifiers (402 and 452) are not necessarily unique between groups.

In this example, the firmware has two interfaces or sides: the front-end (e.g., facing host (204) in FIG. 2) and the back-end (e.g., facing storage (206) in FIG. 2). Correspondingly, the firmware resources in the bottom table (450) are associated with front-end commands (e.g., Group_2) and back-end commands (e.g., Group_3). The front-end command group (i.e., Group_2) has two resource requestors: Host 10 (see row 470) and ME host split (see row 472). The back-end command group (i.e., Group_3) includes only a single resource requestor: BCMD (see row 474).

In one example of how an adjustable resource management module decides whether to grant a resource allocation request (e.g., at step 106 in FIG. 1), all of the following conditions must be satisfied in order for a resource allocation request to be granted:

The group limit (410 or 460) for that group would not be exceeded by the requested number of resources (e.g., taking into account already-allocated resources for that group, recorded in the allocation state information).

The maximum (414 or 464) for that resource requestor (i.e., usage type) would not be exceeded by the requested number of resources (e.g., taking into account resources already-allocated to that resource requestor, recorded in the allocation state information).

All of the minimums (412 or 462) associated with other resource requestors in the same group can still be satisfied or otherwise met, even after allocating the requested number of resources (e.g., taking into account already-allocated resources for other resource requestors in that group, recorded in the allocation state information).

As described in the above example, in some embodiments, the usage type identifier is associated with a first usage type and determining whether to grant the resource allocation request (e.g., at step 106 in FIG. 1) includes considering whether allocating the requested amount would prevent a second usage type, having the same group identifier as the first usage type, from being allocated a second minimum associated with the second usage type.

As indicated by its name, the resource configuration information (e.g., 400 and 450) is adjustable. In some embodiments, a new value is desired to be written to the adjustable resource configuration information which would "break" or otherwise be inconsistent with the other values in the group. In some embodiments, the new value is verified or otherwise checked before the new value is actually written to the adjustable resource configuration information. In one example, a new minimum value is not permitted to be written to the adjustable resource configuration information if the sum of minimums for that group (including the desired new minimum) would exceed the group limit. For example, by preventing the update, this may communicate to the resource requestor that the system cannot honor the desired new minimum. Likewise, by verifying that a desired new maximum does not exceed the group limit, the system can communicate to a resource requestor when or if a desired new maximum can never be honored.

As described above, in some embodiments, the process of FIG. 1 further includes receiving a new value for the adjustable resource configuration information; determining whether the new value would violate a related value in the adjustable resource configuration information; and in the event it is determined that the new value would violate the related value, discarding the new value without writing the new value to the adjustable resource configuration information.

Although not shown here, in some embodiments, a resource (e.g., the buffer) is split amongst multiple groups, each with one or more usage types. In some applications, system components change and the associated resources change. For example, a firmware upgrade may be performed which changes the number and/or types of available firmware resources (e.g., a new resource, an increased number of resources, etc.). Or, a module or block (e.g., within a storage controller) is updated and the type and/or number or resources used by that block change, which changes the demand profile. In some cases, the type of traffic moving through the system changes, which places different demands on firmware and/or hardware resources (e.g., reading back badly degraded data from storage with many errors, putting a greater demand on the error correction decoder to correct the errors). In some applications, a hardware resource is updated (e.g., a buffer is expanded so there are more slots). Such changes in the system can be more easily accommodated adapted to because of the adjustable nature of the resource allocation system described herein.

As described above, in some embodiments, the process of FIG. 1 further includes updating the adjustable resource configuration information with a new value, wherein the new value is associated with one or more of the following: a new resource, an updated version of a (e.g., existing) resource, a new usage type, or an updated version of an existing usage type.

FIG. 4B is a diagram illustrating an embodiment of a change to the number of usage types and groups. In this example, table 450 from FIG. 4A is updated to the state shown here in table 480. For brevity, a usage type identifier column is not shown in the example of table 480. In this example, a new type is added to Group_2: ME host split 2 (482) and for clarity ME host split (472 in FIG. 4A) is now labeled ME host split 1 (484). To accommodate the new usage type in that group, an additional 256 units of that resource has been added to Group_2 (see limit column 486) and Group_3 has been eliminated (e.g., where the additional 256 units of resource are taken from the now-eliminated Group_3 and are given to Group_2). In one example application, such situations may arise when the firmware scheme changes but there is no change to the hardware.

The following figure describes a more detailed example of resource state information (e.g., 304 in FIG. 3).

FIG. 5 is a diagram illustrating an embodiment of resource state information and associated allocation communications. In the example shown, table 500 shows an example of resource state information which tracks the state of 2,048 units of a particular resource. The resource identifier column (502) includes an identifier for each resource. The allocated column (504) tracks whether a particular resource has been allocated. The type identifier column (506) tracks the type identifier of the resource requestor that has been allocated that resource (e.g., assuming the corresponding allocated field is set to TRUE).

In this example, the type identifier (506) is stored in the resource state information (500) so that a mapping between the resource identifier and the type identifier exists and can be used subsequently. For example, consider how resource 0x000 (see row 508) is allocated. Resource allocation request (520) is sent by a resource requestor (having a type identifier of Type_1) to an adjustable resource management module (not shown). The resource allocation request (520) includes a header (522) that identifies the communication as a resource request, the type identifier (524) of the resource requestor, and the group identifier (526) of the group to which the resource requestor belongs. For brevity, a requested amount is not shown (or in some embodiments, a fixed or predefined amount is requested each time).

In response, the adjustable resource management module returns the resource allocation response (540) to the resource requestor. (Assume that in this example, the minimum, maximum, and group limit checks have all passed.) The resource allocation response (540) includes a header (542) identifying the communication as a resource allocation response, the resource identifier (544) of the resource(s) being allocated, and the granted Boolean (546) indicating whether the request was granted or denied. The top row (508) in the resource state information (500) is also updated at this time to reflect the allocation of resource 0x000 (column 502) to type identifier Type_1 (column 506) and the allocated value (column 504) is set to TRUE.

When the resource requestor no longer needs the allocated resource, a deallocation message (560) is sent to the adjustable resource management module which includes a header (562) identifying the communication as a deallocation message, the resource identifier (564) being deallocated, and the group identifier (566) of the resource requestor.

Note that the deallocation message (560) does not include the type identifier, so the adjustable resource management module would not be able to update its allocation counts of how many resources are currently allocated to each usage type based solely on the information included in the deallocation message (560). However, because the type identifier (524) included in the request (520) is saved in the resource state information (500) when resource 0x000 is allocated, the adjustable resource management module knows for which usage type to decrement the allocation count. Accurate and timely allocation counts are needed, for example, to ensure that the minimums and/or maximums are not violated, nor are requests unnecessarily denied.

As shown in this example, in some embodiments, granting the resource allocation request (e.g., at step 112 in FIG. 1) includes storing a mapping between the usage type identifier and a resource identifier in the resource state information.

In some embodiments, a deallocation message (e.g., 560) originates from the resource itself, as opposed to the resource requestor that wanted to use it. The following figure shows an example of this.

Figure 6:
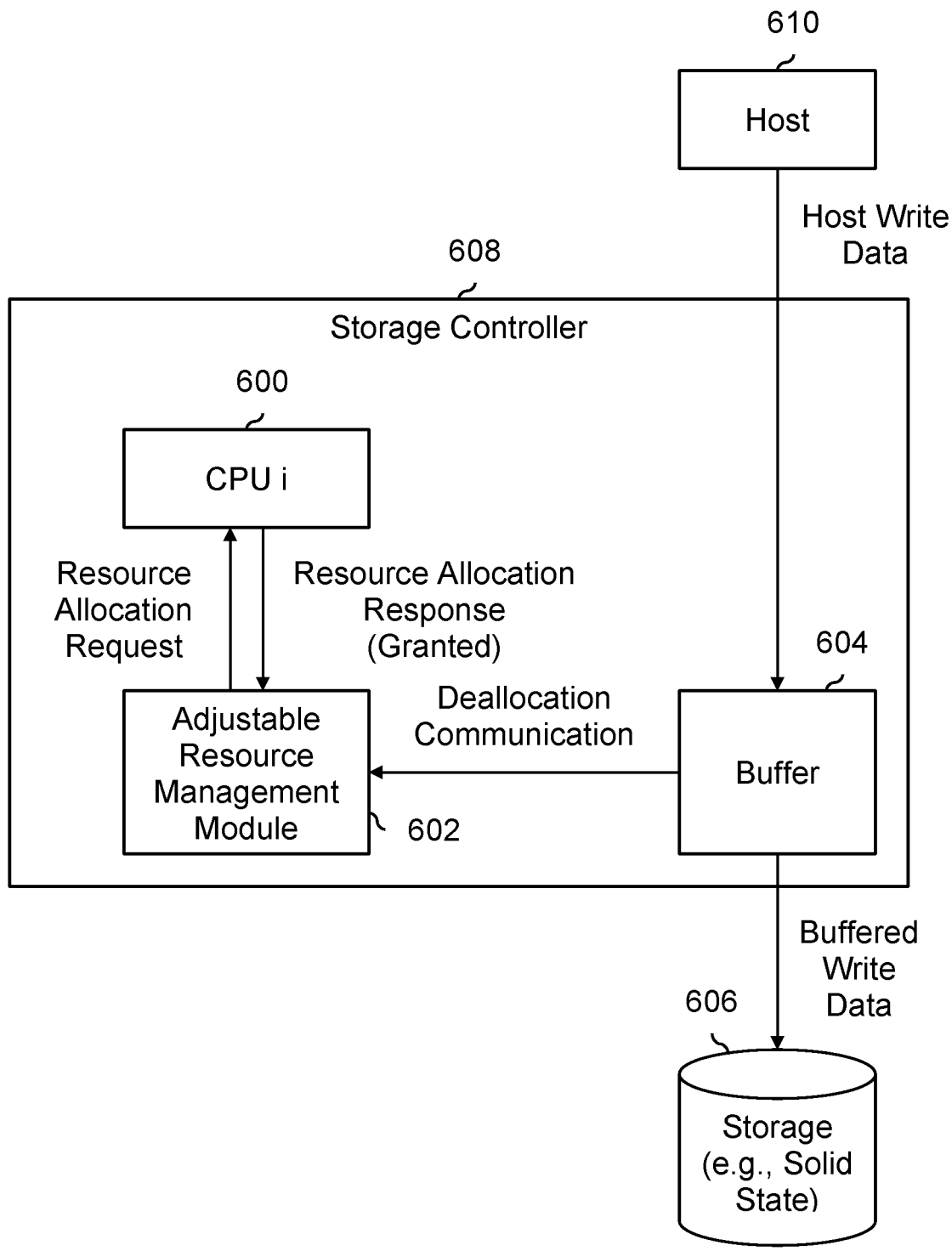
FIG. 6 is a diagram illustrating an embodiment of a deallocation message that originates from a resource.

FIG. 6 is a diagram illustrating an embodiment of a deallocation message that originates from a resource. In the example shown, slots in the buffer (604) are desired for a host write where the write data will eventually be written to storage (606). A CPU i (600), which acts as an intermediary of the host (610) and is one of a plurality of CPUs in the storage controller (608), sends a resource allocation request to the adjustable resource management module (602). In this example, the adjustable resource management module (602) grants the request and returns a resource allocation response to CPU i (600).

Once slots in the buffer (604) have been allocated, the host (610) sends host write data to the buffer (604) to be stored in the allocated slots. The storage controller (608) sends the buffered write data from the buffer (604) to the storage (606). In some cases, there may be other, earlier read or write instructions sent to the storage (606) that need to be executed before the buffered write data can be written to the storage and therefore the write may not complete immediately.

Once the buffered write data has successfully been written to storage (606), a deallocation communication is sent (e.g., directly) to the adjustable resource management module (602) from the buffer (604) so that the allocated slots in the buffer can be released as soon as possible. In some embodiments, other components (e.g., hardware or firmware CPU) other than the resource requestor can send a de-allocation request. In contrast, some other resource management systems only receive deallocation communications from the resource requestor. However, this delays the deallocation of the buffer and/or is a less efficient use of system resources.

For simplicity and ease of explanation, the deallocation communication is shown in this example as originating from the buffer (604); this assumes that the resource (in this example, the buffer) has sufficient state information to know when to issue a deallocation communication (e.g., in this case, that the host write data has been successfully transferred to storage (606) and the allocated buffer slots can be freed). In some applications, the buffer (or other resource) does not know when the resource requestor is done with the allocated buffer slots. In some such embodiments, another module or block (such as an intermediary manager or controller and that is not the resource requestor) that manages or oversees the resource and has the appropriate knowledge or information to know when to issue a deallocation communication generates the deallocation communication and sends it to the adjustable resource management module.

As shown in this figure, in some embodiments, the process of FIG. 1 further includes: deallocating the requested amount of the resource in response to receiving a deallocation communication from the resource. As described above, in some embodiments, the process of FIG. 1 further includes: deallocating the requested amount of the resource in response to receiving a deallocation communication from the resource and updating an allocation count associated with the usage type identifier, including by accessing a mapping between a resource identifier and the usage type identifier that is stored in the resource state information (see, e.g., the mapping that is stored in resource state information (500) in FIG. 5).

Returning briefly to FIG. 4A, in some embodiments, some information stored in adjustable resource configuration information is changed. The following figure describes one example about how an adjustable resource management module responds to or otherwise handles such a change.

Figure 7:
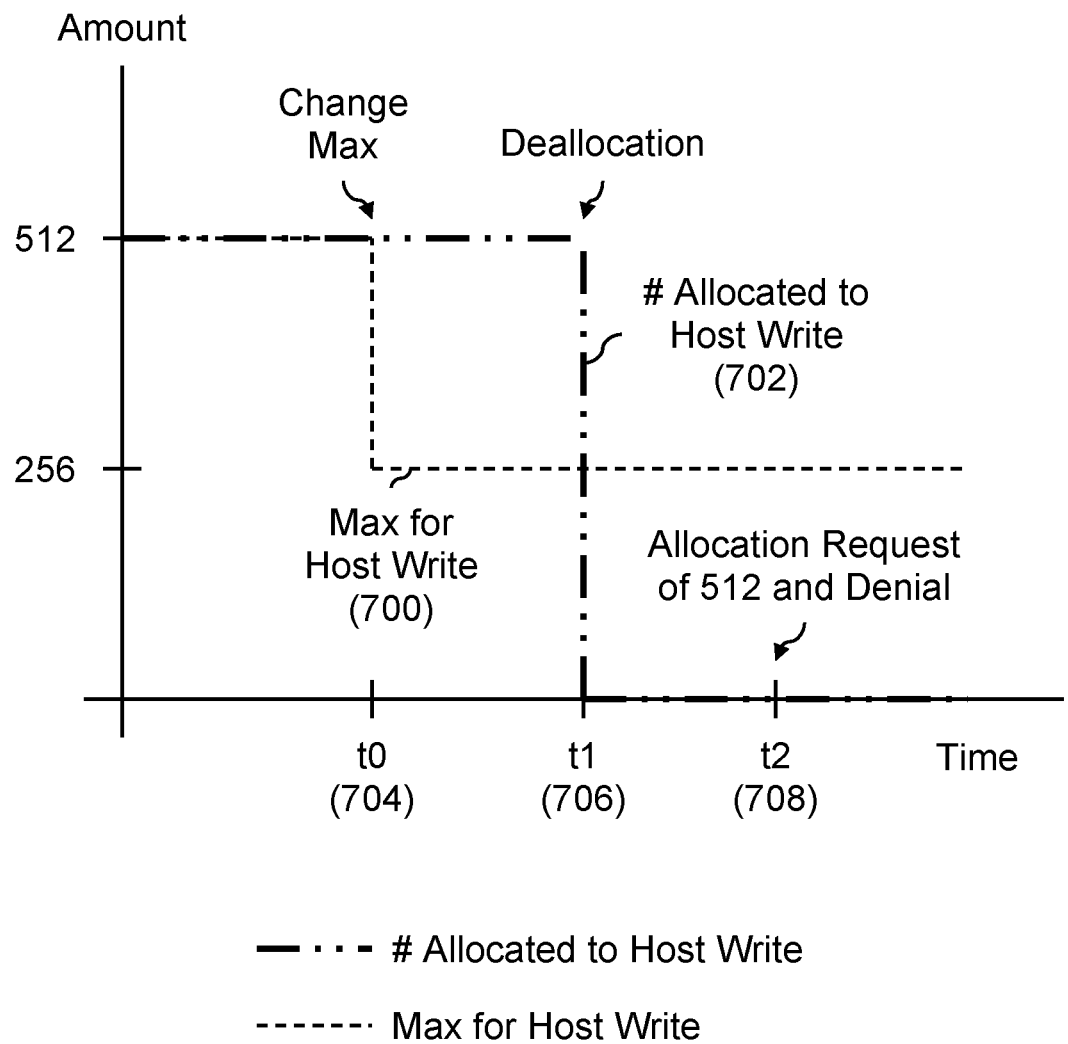
FIG. 7 is a graph illustrating an embodiment of a maximum associated with a host write usage type that is adjusted.

FIG. 7 is a graph illustrating an embodiment of a maximum associated with a host write usage type that is adjusted. In this example, both the maximum (700) as well as the allocated number (702) for host writes are shown. At the beginning of the graph (e.g., before time t0 (704)), the host write is allocated the maximum of 512 (e.g., of buffer slots) and therefore the maximum (700) and the allocated number (702) are both 512.

At time t0 (704), the maximum (700) is reduced from 512 to 256. In this example, the already-allocated resources are "grandfathered in." That is, the host write is permitted to retain its 512 allocated buffer slots, even though after time t0 (704), the allocated number (702) of 512 exceeds the current maximum (700) of 256. This may be desirable in some applications since it permits the resource requestor to complete its process and/or usage of the allocated resource without any disruption.

At time t1 (706), the resource requestor no longer needs the allocated resource and a deallocation occurs, reducing the allocated number (702) from 512 to 0.

At time t2 (708), the resource requestor desires 512 buffer slots and requests that amount. However, because the request amount is greater than the current maximum of 256, the request is denied.

As shown in this example, in some embodiments, the process of FIG. 1 further includes: after the resource allocation request is granted, updating the maximum in the adjustable resource configuration information with a new maximum that is strictly less than the requested amount, wherein the requested amount of the resource continues to be granted even after the adjustable resource configuration information is updated with the new maximum.

In some embodiments, the usage of a resource is monitored and the resource configuration information is adjusted in real time to adapt to current usage patterns or traffic. The following figure describes one example process of this.

Figure 8:
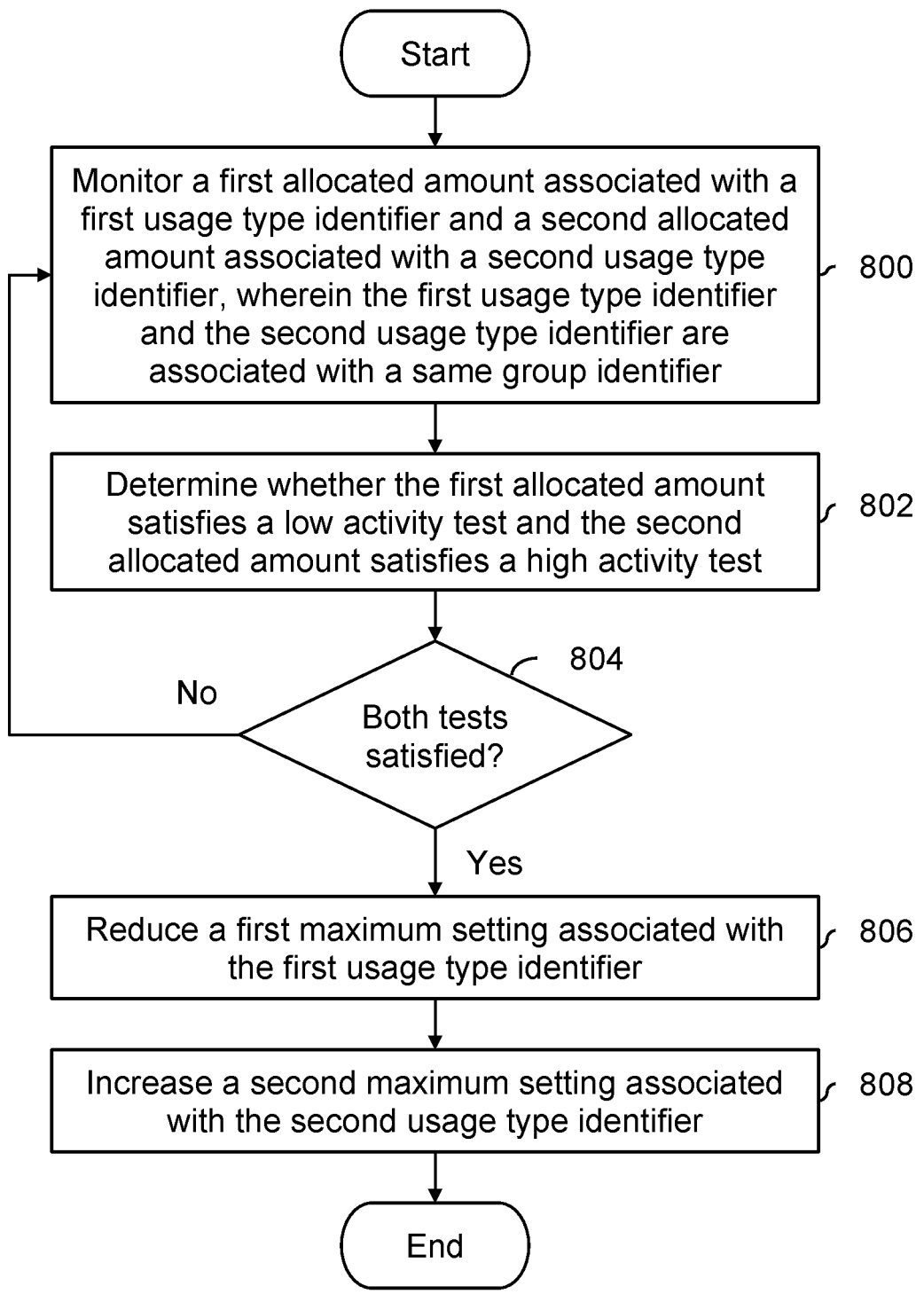
FIG. 8 is a flowchart illustrating an embodiment of a process to adjust the resource configuration information in response to real time usage.

FIG. 8 is a flowchart illustrating an embodiment of a process to adjust the resource configuration information in response to real time usage. In some embodiments, the process is performed by one of the CPUs (212a-212b) in FIG. 2. In some embodiments, the process is performed in combination with the process of FIG. 1.

At 800, a first allocated amount associated with a first usage type identifier and a second allocated amount associated with a second usage type identifier are monitored, wherein the first usage type identifier and the second usage type identifier are associated with a same group identifier. For example, suppose the system is a storage system (see, e.g., FIG. 2) and the first usage type identifier is associated with (e.g., a host) writing to storage and the second usage type identifier is associated with (e.g., a host) reading from storage.

At 802, it is determined whether the first allocated amount satisfies a low activity test and the second allocated amount satisfies a high activity test. For example, resource state information (e.g., 500 in FIG. 5) may be accessed to determine the amount of resources currently allocated to a particular usage type identifier. In some embodiments, the first allocated amount (e.g., a number of allocated buffer slots) satisfies a low activity test if it is less than some threshold (e.g., using less than 10% or 5% of maximum for that usage type). Similarly, the second allocated amount may satisfy a high activity test if it is greater than some threshold (e.g., using more than 90% or 95% of maximum for that usage type). In some embodiments, the low activity test and/or the high activity test take into account an allocated amount over some window of time.

If at least one of the tests is not satisfied (804) then monitoring continues (800). If both of the tests are satisfied (804) then a first maximum setting associated with the first usage type identifier is reduced at 806 and a second maximum setting associated with the second usage type identifier is increased at 808. To put it another way, the adjustments to the first maximum setting and to the second maximum setting are performed such that no minimum of the group is violated, and also such that the sum of the new maximums for the usage types does not exceed the maximum for the group.

For example, suppose that the storage system shown in FIG. 2 switches to a state or mode where the host (204) is reading a significant amount of information from the storage (206) and is doing few or no writes. As shown in the example of FIG. 4A (see table 400), host writes (422) may be in the same group as host reads (424) and therefore share buffer slots. During a heavy read and light write period, it may be desirable to increase the maximum for pre-reads and reduce the maximum for host writes since the system is doing so much reading and so little writing (or vice versa). Naturally, if the traffic and/or usage patterns were to subsequently change, the resource configuration information could be adjusted again using real time information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage controller system, including:
   a first interface to solid state storage, wherein the solid state storage is configured to store two or more bits per storage cell;
   a second interface to a host;
   a plurality of central processing units (CPUs) that is configured to support one or more host access instructions, from the host, that are associated with accessing the solid state storage; and
   a resource management module, implemented independently of the plurality of CPUs, that is configured to:
      receive a resource allocation request that includes a usage type identifier and requested amount of a resource, wherein the usage type identifier is associated with a group identifier;
      access adjustable resource configuration information to obtain: (1) a maximum associated with the usage type identifier, (2) a minimum associated with the usage type identifier, and (3) a group limit associated with the group identifier;
      access resource state information;
      determine whether to grant the resource allocation request based at least in part on the maximum, the minimum, the group limit, and the resource state information;
      in the event it is determined to grant the resource allocation request, grant the resource allocation request;
      in the event it is determined to not grant the resource allocation request, deny the resource allocation request; and
      update the adjustable resource configuration information with a new value, wherein the new value is associated with one or more of the following: a new resource, an updated version of the resource, a new usage type, or an updated version of an existing usage type.

2. The system recited in claim 1, wherein the resource management module is implemented at least in part using one or more of the following: an application-specific integrated circuit (ASIC), a field-programmable gate array (FPGA), or a general-purpose integrated circuit.

3. The system recited in claim 1, wherein the resource includes one or more of the following: a hardware resource, a buffer in hardware, a RAID bin in hardware, a firmware resource, a front-end command in firmware, or a back-end command in firmware.

4. The system recited in claim 1, wherein:
   the usage type identifier is associated with a first usage type; and
   determining whether to grant the resource allocation request includes considering whether allocating the requested amount would prevent a second usage type, having the same group identifier as the first usage type, from being allocated a second minimum associated with the second usage type.

5. The system recited in claim 1, wherein the resource management module is further configured to:
  receive a new value for the adjustable resource configuration information;
  determine whether the new value would violate a related value in the adjustable resource configuration information; and
  in the event it is determined that the new value would violate the related value, discard the new value without writing the new value to the adjustable resource configuration information.

6. The system recited in claim 1, wherein granting the resource allocation request includes storing a mapping between the usage type identifier and a resource identifier in the resource state information.

7. The system recited in claim 1, wherein the resource management module is further configured to: deallocate the requested amount of the resource in response to receiving a deallocation communication from the resource.

8. The system recited in claim 1, wherein the resource management module is further configured to:
  deallocate the requested amount of the resource in response to receiving a deallocation communication from the resource; and
  update an allocation count associated with the usage type identifier, including by accessing a mapping between a resource identifier and the usage type identifier that is stored in the resource state information.

9. The system recited in claim 1, wherein the resource management module is further configured to: after the resource allocation request is granted, update the maximum in the adjustable resource configuration information with a new maximum that is strictly less than the requested amount, wherein the requested amount of the resource continues to be granted even after the adjustable resource configuration information is updated with the new maximum.

10. The system recited in claim 1, wherein the resource management module is further configured to:
  monitor a first allocated amount associated with a first usage type identifier and a second allocated amount associated with a second usage type identifier, wherein the first usage type identifier and the second usage type identifier are associated with a same group identifier;
  determine whether the first allocated amount satisfies a low activity test and the second allocated amount satisfies a high activity test; and
  in the event the low activity test and the high activity test are both satisfied:
    reduce a first maximum setting associated with the first usage type identifier; and
    increase a second maximum setting associated with the second usage type identifier.

11. A method, including:
  providing a first interface to solid state storage, wherein the solid state storage is configured to store two or more bits per storage cell;
  providing a second interface to a host;
  providing a plurality of central processing units (CPUs) that is configured to support one or more host access instructions, from the host, that are associated with accessing the solid state storage; and
  providing a resource management module, implemented independently of the plurality of CPUs, that is configured to:
    receive a resource allocation request that includes a usage type identifier and requested amount of a resource, wherein the usage type identifier is associated with a group identifier;
    access adjustable resource configuration information to obtain: (1) a maximum associated with the usage type identifier, (2) a minimum associated with the usage type identifier, and (3) a group limit associated with the group identifier;
    access resource state information;
    determine whether to grant the resource allocation request based at least in part on the maximum, the minimum, the group limit, and the resource state information;
    in the event it is determined to grant the resource allocation request, grant the resource allocation request;
    in the event it is determined to not grant the resource allocation request, deny the resource allocation request; and
    update the adjustable resource configuration information with a new value, wherein the new value is associated with one or more of the following: a new resource, an updated version of the resource, a new usage type, or an updated version of an existing usage type.

12. The method recited in claim 11, wherein the resource management module is implemented at least in part using one or more of the following: an application-specific integrated circuit (ASIC), a field-programmable gate array (FPGA), or a general-purpose integrated circuit.

13. The method recited in claim 11, wherein:
  the usage type identifier is associated with a first usage type; and
  determining whether to grant the resource allocation request includes considering whether allocating the requested amount would prevent a second usage type, having the same group identifier as the first usage type, from being allocated a second minimum associated with the second usage type.

14. The method recited in claim 11, wherein the resource management module is further configured to:
  receive a new value for the adjustable resource configuration information;
  determine whether the new value would violate a related value in the adjustable resource configuration information; and
  in the event it is determined that the new value would violate the related value, discard the new value without writing the new value to the adjustable resource configuration information.

15. The method recited in claim 11, wherein granting the resource allocation request includes storing a mapping between the usage type identifier and a resource identifier in the resource state information.

16. The method recited in claim 11, wherein the resource management module is further configured to:
  deallocate the requested amount of the resource in response to receiving a deallocation communication from the resource; and
  update an allocation count associated with the usage type identifier, including by accessing a mapping between a resource identifier and the usage type identifier that is stored in the resource state information.

17. The method recited in claim 11, wherein the resource management module is further configured to: after the resource allocation request is granted, update the maximum in the adjustable resource configuration information with a new maximum that is strictly less than the requested amount, wherein the requested amount of the resource continues to be granted even after the adjustable resource configuration information is updated with the new maximum.

18. The method recited in claim 11, wherein the resource management module is further configured to:
- monitor a first allocated amount associated with a first usage type identifier and a second allocated amount associated with a second usage type identifier, wherein the first usage type identifier and the second usage type identifier are associated with a same group identifier;
- determine whether the first allocated amount satisfies a low activity test and the second allocated amount satisfies a high activity test; and
- in the event the low activity test and the high activity test are both satisfied:
  - reduce a first maximum setting associated with the first usage type identifier; and
  - increase a second maximum setting associated with the second usage type identifier.

19. The method recited in claim 11, wherein the resource includes one or more of the following: a hardware resource, a buffer in hardware, a RAID bin in hardware, a firmware resource, a front-end command in firmware, or a back-end command in firmware.

20. The method recited in claim 11, wherein the resource management module is further configured to: deallocate the requested amount of the resource in response to receiving a deallocation communication from the resource.

* * * * *